Patented Mar. 12, 1946

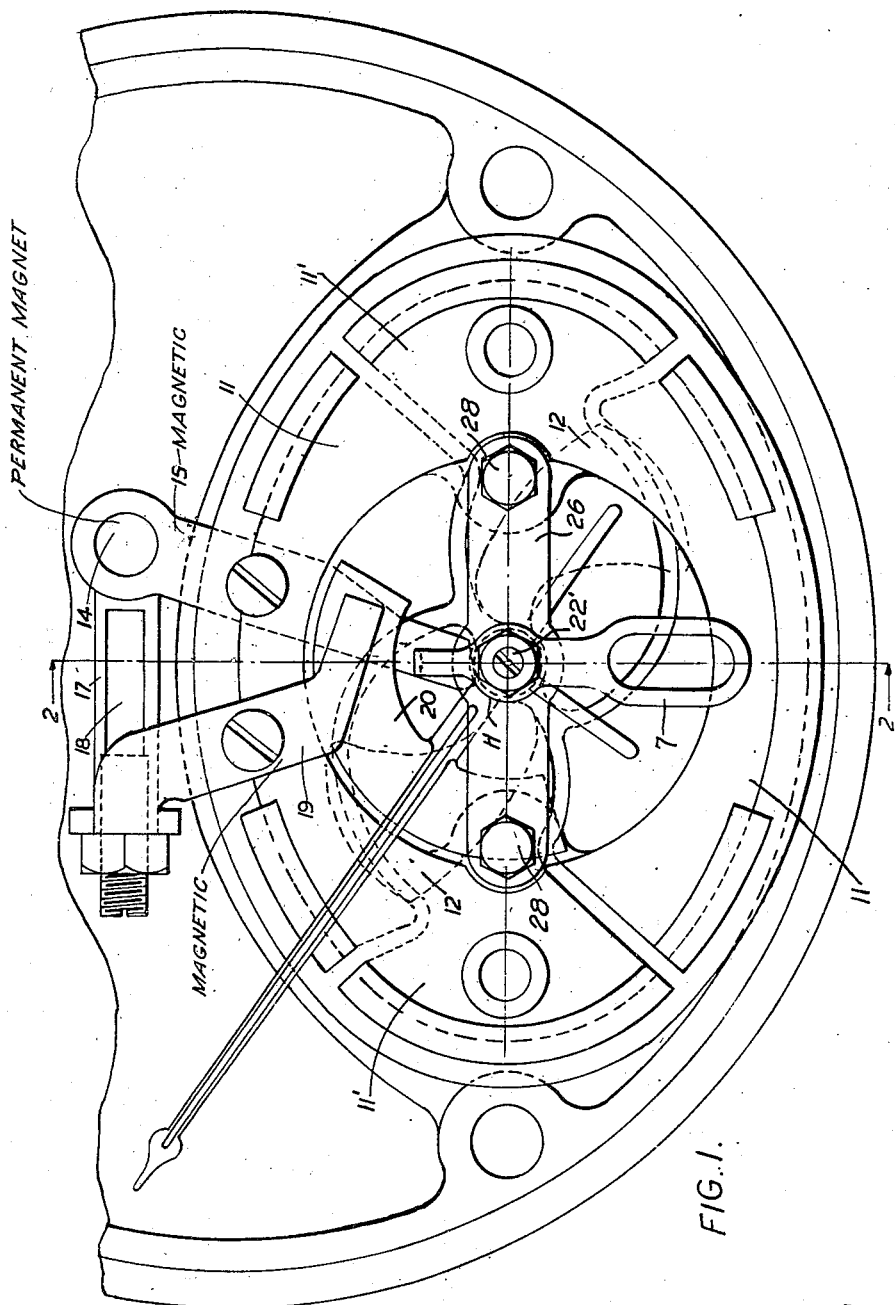

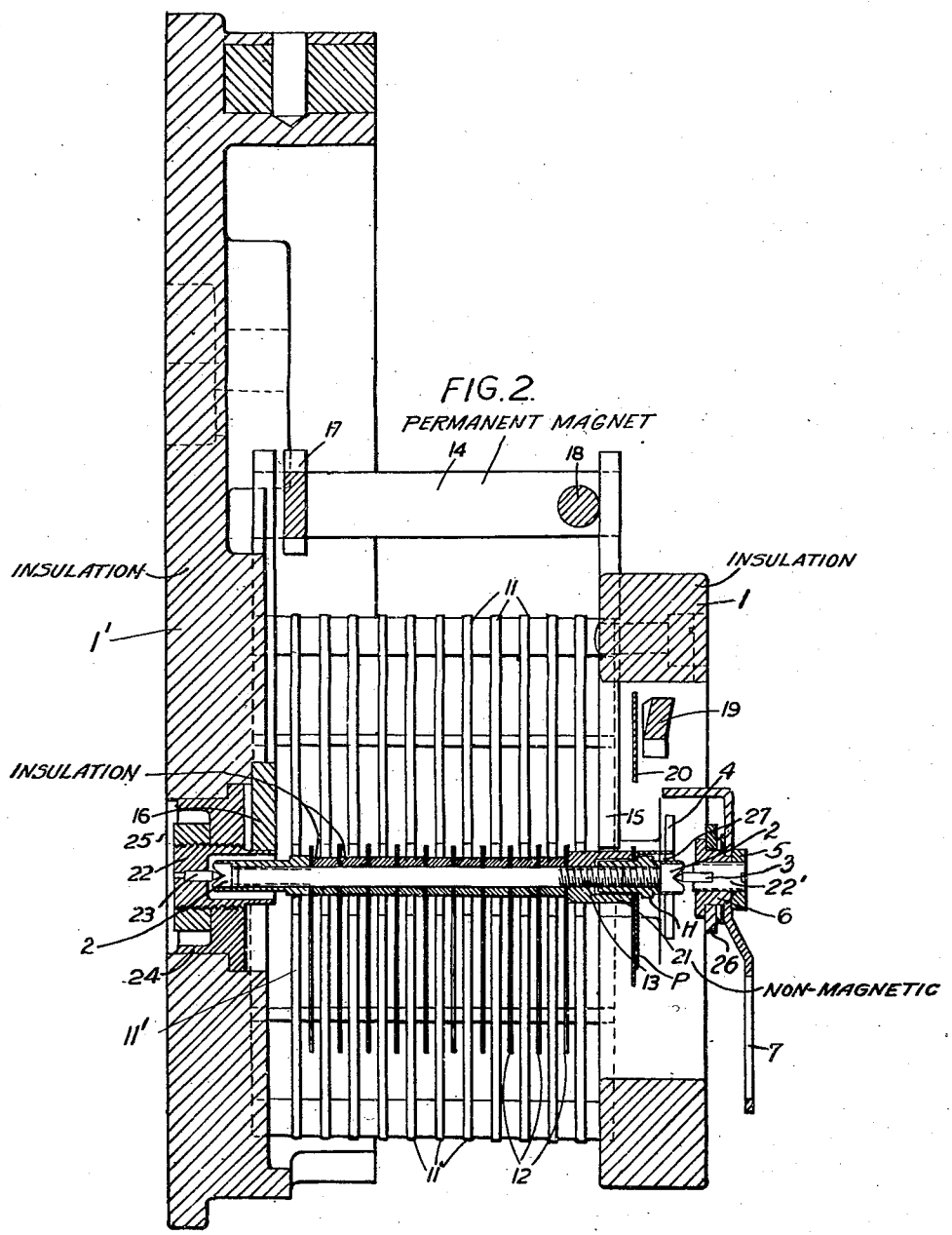

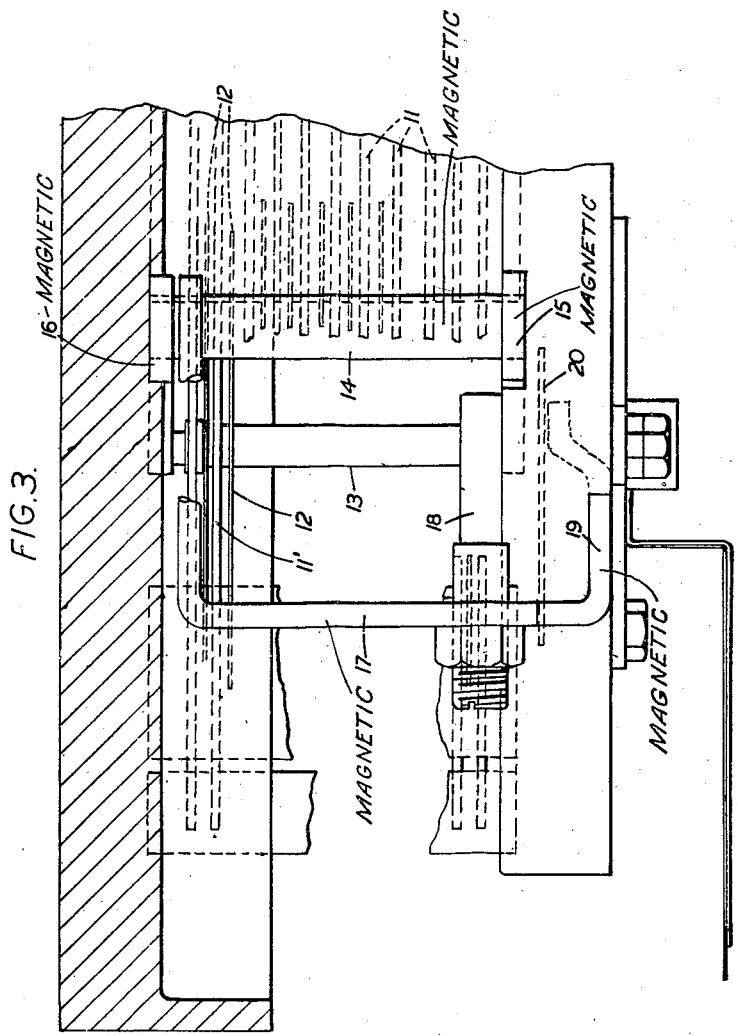

2,396,464

UNITED STATES PATENT OFFICE 2,396,464

ELECTRICAL MEASURING INSTRUMENT

John Handley, London, W. C. 2, England, assignor, by mesne assignments, to International Standard Electric Corporation, New York, N. Y., a corporation of Delaware Application February 27, 1943, Serial No. 477,405
In Great Britain April 10, 1942

5 Claims. (Cl. 171—95)

This invention refers to improvements in electrical measuring instruments of the type in which the moving system is pivoted horizontally; and is more particularly applicable to lower voltage electrostatic instruments, where a multiple of vanes are used and the available torque is small in proportion to the pressure on the pivots.

The invention refers to a method of partially supporting the moving system by magnetic means, and further to combining magnetic damping in the same magnetic circuit.

The invention consists in reducing the effect of the earth's gravitational field upon the spindle or rotor by means of an opposing magnetic field.

The magnet preferably has extended pole pieces which are disposed over each end of the centre spindle, the spindle being made from magnetic material.

An iron disc, surmounted with an aluminum or copper ring may be interposed between each end of the spindle and its associated pole piece for the purpose of effecting eddy current damping. Alternatively, to reduce the possibility of pointer lag through hysteresis in the discs, these discs may be dispensed with and the pole pieces may be brought down towards the spindle which is of small diameter where hysteresis effect would have a minimum torque value.

In the latter case an additional air gap is provided in the magnetic circuit and an aluminum disc or segment is arranged to swing in this air gap to provide eddy current damping.

A substantial air gap is arranged between the spindle and the pole pieces so that the small up and down play in the pivot bearings will not materially affect the pull of the magnet. As an example, if the flux density is such that with a 40 mils air gap the spindle is just suspended, then an increase or reduction in this gap due to play, of 4 mils, will still ensure that bearings are only subjected to 10 per cent of the pressure that would apply without a magnet.

Tubular aluminum distance pieces or sleeves between the clamping nuts and the vanes may be used as a guide to gauge the approximate distance between the spindle and the pole pieces, the pole pieces and magnet being adjusted so as just to clear the sleeves.

The damping flux gap may be in series with or in parallel with the supporting flux gaps.

The latter case will serve to retain more flux in the magnet when it is removed from the instrument and is generally more suitable to the conditions favouring the new materials used in permanent magnets such as "Alnico" and "Ticonal".

The magnet itself can be a straight circular rod finished to size by centreless grinding, and the pole pieces may be stamped out of sheet metal, and bent to shape and attached to the magnet by having a hole in each piece, the ends of the magnet being pressed into them as a force fit.

The description will be completed by reference to the accompanying drawings which show by way of example one embodiment of the invention as follows:

Fig. 1 is a front view of the meter with the customarily employed graduated face plate or dial removed;

Fig. 2 is a section on the centre line, i. e. on the line 2—2 of Fig. 1; and

Fig. 3 is a plan view, some parts being omitted or broken away for the sake of clarity.

The illustrated embodiment of the invention is an electrostatic voltmeter of the quadrant type comprising the customary front and rear casing members 1 and 1' of insulating material between which are supported in insulated and spaced relation the usual stator vanes 11 and 11'. These are of the quadrant type and are electrically connected in pairs so as to be of opposite polarity.

In the present instance, they are shown of a special form arranged in one plane and supported by spiral slits, and cooperating with rotor blades of spiral shape. This is the subject matter of applicant's co-pending application, Serial No. 477,406, filed February 27, 1943.

For the purpose of this application, they may be considered as of any suitable form. In Fig. 2 of the drawings, a number of parallel vanes 12 are shown mounted upon the spindle and spaced by air gaps to receive therebetween vanes of the stator coacting with the rotor vanes so as to rotate spindle 13 in response to the electrostatic forces acting on the rotor vanes. Spindle 13 is journalled between pivot pins 3, 23 fitting into end pieces 2 attached to spindle 13. Pivot pins 3, 23 are fixed in block pieces 22, 22'. Block piece 22 is secured into bushing 24, which is pressed into an opening 25 of casing member 1. Block piece 22' is secured into bushing 6, which is rigidly supported by bracket 26 (Fig. 1) attached to casing member 1 by means of screws 28.

By turning block pieces 22, 22' in their threads, the position of the pivot means may be adjusted to vary the amount of friction in the pivot bearings.

Spindle 13 has screwed thereupon a pointer P, by means of a thread provided in hub H of pointer P (Fig. 2).

The electrostatic force exerted upon the rotor is measured against the force of a spring indicated schematically at 4, the inner end of which at 27 is attached to the spindle and the outer end of which is attached to the upper end of an adjustment lever 7. Adjustment lever 7 is attached to bushing 6 by means of nut 5. It serves to adjust the zero setting of the instrument by turning bearing 2, 3 about the axis of rotation. The quadrants of the stator vanes are electrically connected in pairs to be of opposite polarity in the manner well known.

The present invention consists in a magnet support for the rotor; to this end there is provided a permanent bar magnet 14 located above the stator-rotor assembly and parallel with the spindle 13. Fitted onto the front and rear ends of this magnet are pole-pieces 15 and 16 which extend downwardly so that their end faces overlie the spindle 13 adjacent to its bearings. The spindle is itself of magnetic material to complete the magnetic circuit, so that the attraction exerted by the magnet upon the spindle in an upward direction counteracts in part the attraction exerted in a downward direction by the earthward gravitation, and thus the weight on the bearings is relieved.

It is desirable that the strength of this upward attraction should be adjustable; and to this end there is provided a magnetic shunt to the circuit already described. Thus an L-shaped member 17 of soft iron is arranged with an aperture in the extremity of one of its legs fitted over the rear end of the permanent magnet 14 so that its other leg extends forwardly parallel to the magnet. Passing through an aperture in the forward end of this latter leg is a soft iron rod 18 which can be shifted longitudinally as by a screw-threaded engagement with the aperture to vary the width of the air gap between its forward end and the flank of the magnet 14. The greater or lesser width of this gap determines the lesser or greater shunting effect upon the magnetic circuit through the rotor spindle 13 and hence the greater or lesser degree of the relief on the bearings due to the weight of the rotor.

A further feature of the invention as shown in this embodiment is the provision of magnetic damping. This same L-shaped shunt member 17 has an extension 19 which passes forwardly and downwardly so as to overlie a segmental plate 20 of conducting material which is carried by the rotor-pointer assembly, so that movement of the segmental plate upon deflection of the pointer will give rise to eddy currents to damp the movement in well known manner. In this embodiment the damping flux gap is of course in parallel with the supporting flux gaps.

A tubular distance-piece 21 of non-magnetic material is mounted on the spindle 13 at the front end, between the pointer P and the vanes 12. This distance piece serves as a guide to gauge the approximate distance between the spindle and the pole piece 15. The pole piece is adjusted so as just to clear the sleeve. At the rear end on the other hand there is a fixed piece 22, which is actually the carrier for the pivot pin 23; the pole-piece 16 can be in direct contact with this piece.

What is claimed is:

1. In a measuring instrument, a rotatable shaft comprising a magnetizable portion, bearings supporting said shaft, a number of rotor blades separated by air gaps, and attached to said shaft, stator blades extending into said air gaps, a damping member made of conductive non-magnetizable material and attached to said shaft, and stationary magnetic means for producing a magnetic field one portion of which passes through said magnetizable shaft portion and another portion of which passes through said damping member.

2. An instrument according to claim 1, wherein at least one of the field portions passes at least one adjustable air gap.

3. In a measuring instrument, a rotatable shaft comprising a magnetizable portion, means for supporting said shaft, a number of rotor blades separated by air gaps, and attached to said shaft, stator blades extending into said air gaps, a non-magnetizable damping member supported by the shaft, magnetic means including a magnetic circuit passing through the magnetizable shaft portion, and a magnetic shunt circuit derived therefrom and passing through said non-magnetizable damping member.

4. An instrument according to claim 3, comprising means for varying the flux through said magnetic shunt circuit.

5. An electrostatic measuring instrument according to claim 1, wherein said magnetic means comprises a stationary permanent magnet extending longitudinally parallel to said shaft, a non-magnetizable metal disc attached to said shaft, pole pieces attached to said magnet and extending therefrom perpendicularly towards said shaft to form a magnetic circuit therewith, a shunting pole piece arranged parallel to one of said pole pieces with an air gap therebetween, said shunting pole piece extending to said metal disc forming an air gap therewith, and means for adjusting the position of said shunting pole piece to vary said air gaps simultaneously.

JOHN HANDLEY.